US011933375B1

United States Patent
Corcoran et al.

(10) Patent No.: US 11,933,375 B1
(45) Date of Patent: Mar. 19, 2024

(54) DEVICE AND METHOD FOR EXTRACTING AN ADJUSTER UNIT OF A BRAKE ASSEMBLY

(71) Applicant: ZF CV Systems Europe BV, Brussels (BE)

(72) Inventors: Thomas Corcoran, Leonard, MI (US); Rick Dinkel, Harrison Township, MI (US)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 18/100,651

(22) Filed: Jan. 24, 2023

(51) Int. Cl.
    *B23P 11/00*     (2006.01)
    *B25B 27/02*     (2006.01)
    *F16D 65/00*     (2006.01)

(52) U.S. Cl.
    CPC .......... *F16D 65/0043* (2013.01); *B25B 27/02* (2013.01); *F16D 2250/0084* (2013.01)

(58) Field of Classification Search
    CPC ........ F16D 65/0043; F16D 2250/0084; F16D 2250/0092; B25B 27/02; B25B 27/023; B25B 27/06; B25B 27/28; B23P 19/02; B23P 19/025; B23P 11/00
See application file for complete search history.

(56) References Cited

FOREIGN PATENT DOCUMENTS

| EP | 3179127 A1 * | 6/2017 | ......... F16D 55/2255 |
|---|---|---|---|
| GB | 2522641 A * | 8/2015 | ........... F16D 55/226 |
| WO | WO-2010012427 A1 * | 2/2010 | ........... F16D 65/567 |

OTHER PUBLICATIONS

MaxxTM22 Mechanical Sliding Caliper Disc Brake Assembly and Maintenance Instructions (Year: 2016).*
Tool set adjuster change drawing (Year: 2016).*
English translation of EP3179127 (Year: 2017).*
English translation of GB2522641 (Year: 2015).*
English translation of WO2010012427 (Year: 2010).*
WABCO Product Catalogue (Year: 2020).*
MAXX 22, Mechanical Sliding Caliper Disc Brake Assembly and Maintenance Instructions, Edition 4, Version 2 (Dec. 2016), http://www.wabco.info/i/207.

* cited by examiner

*Primary Examiner* — Jun S Yoo
(74) *Attorney, Agent, or Firm* — Dickinson Wright PLLC

(57) ABSTRACT

A device (100) for extracting an adjuster unit (20) of a brake assembly (25), which includes a shaft (22), a gear (24), and a sleeve (26), includes an insert (102) configured to be partially inserted between the peripheral wall (26a) of the sleeve (26) and a proximal end (22a) of the shaft. The insert (102) includes an engaging section (104) for engaging the sleeve (26) and an inner volume (106) for receiving the proximal end of the shaft (22). An actuator (108) is operatively coupled to the insert (102) and transmits an extraction force (F) so as to move the insert (102) and at least the sleeve (26) away from the brake assembly. The sleeve (26) has a sealing lip (26b) extending radially inwards from the peripheral wall of the sleeve (26), and the insert (102) includes a groove (107) configured to engage the sealing lip.

17 Claims, 6 Drawing Sheets

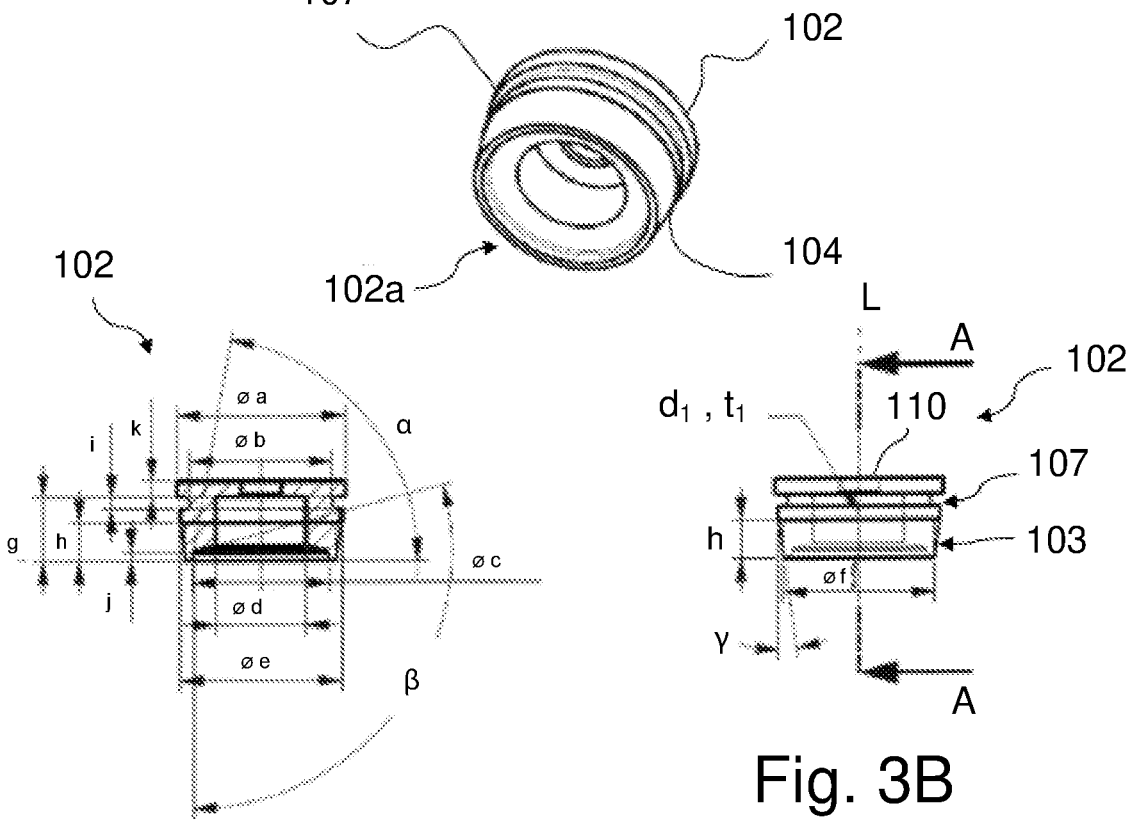

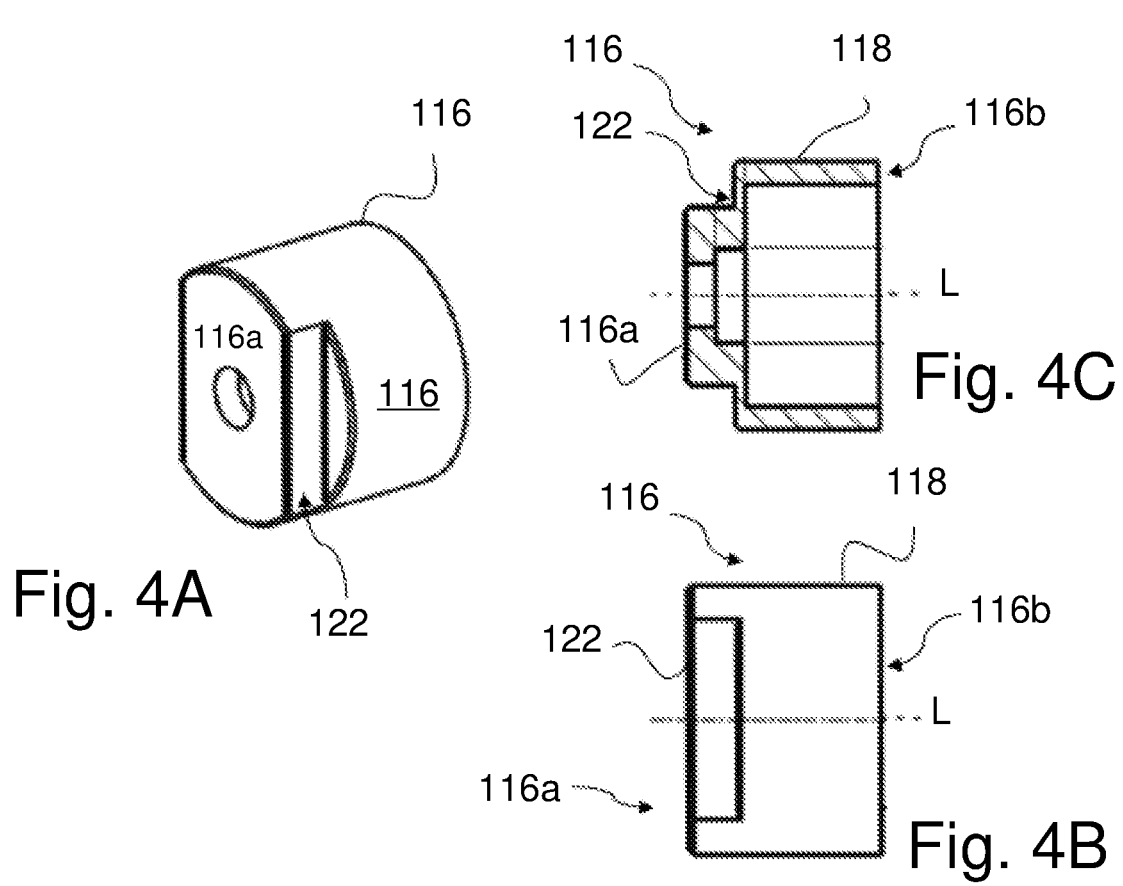

DEVICE AND METHOD FOR EXTRACTING AN ADJUSTER UNIT OF A BRAKE ASSEMBLY

FIELD

The present disclosure relates to a device for extracting an adjuster unit of a brake assembly and to a corresponding method for extracting an adjuster unit.

BACKGROUND

Disc brakes, especially mechanical disc brakes with a sliding caliper, typically include an adjuster unit for compensating pad wear. The adjuster unit, also referred to as return unit or reset unit, is used for adjusting a tensioning unit and thus a clearance of the brake assembly. The adjuster unit typically includes three parts: a shaft, a gear, and a sleeve. Depending on the design, the adjuster unit can have a shaft with different hexagonal heads.

A maintenance document titled "MAXX™ 22 Mechanical sliding caliper disc brake assembly and maintenance instructions", Edition 4, version 2 (December 2016), http://www.wabco.info/i/207, describes in section 12, pages 66-72 the steps and tools necessary to replace the adjuster unit. Currently, two aftermarket kits are necessary to replace an adjuster unit.

SUMMARY

It would be desirable, and was thus an object of the invention, to provide an alternative device for a faster and simpler extraction of the adjuster unit.

According to a first aspect of the disclosure, the object of the invention is achieved by a device as described herein.

The device according to the first aspect is configured to extract an adjuster unit of a brake assembly, the adjuster unit including a shaft having a proximal end, a gear and a sleeve having a peripheral wall extending circumferentially around the proximal end of the shaft. The device includes an insert configured to be partially inserted between the peripheral wall of the sleeve and the proximal end of the shaft, and including an engaging section for engaging the sleeve and an inner volume for receiving the proximal end of the shaft. The device also includes an actuator operatively coupled to the insert and configured to, in an inserted state of the insert, transmit an extraction force to the sleeve to move the insert away from the brake assembly.

The sleeve in particular includes an inner sealing lip extending radially inwards from a proximal end of the peripheral wall of the sleeve, and the insert, in the engaging section, includes a groove that is configured to engage the inner sealing lip.

By engaging the groove in the insert, the inner sealing lip efficiently transfers the extraction force from the actuator, which is operatively coupled to the insert, to the sleeve. Depending on the gripping forces between the sleeve and the proximal end of the shaft, either the sleeve alone or the whole adjuster unit are removed using the device according to first aspect of the disclosure.

It shall be understood that within this document, the terms proximal and distal are defined with respect to the user, i.e. proximal refers to ends, sections, parts, segments, etc. that are closer to and/or facing the user, whereas distal refers to ends, sections, parts, segments, etc. that are farther and/or facing away from the user. In other terms, distal refers to ends, sections, parts, segments, etc. that are closer to and/or facing an interior of the brake assembly.

In the following, developments of the device of the first aspect of the invention will be described.

In a development, the insert includes a through hole in a longitudinal direction and the actuator comprises a bar arranged through the through hole and a bar actuator connected to the bar for moving the bar away from the brake assembly in a longitudinal direction, thereby transmitting the extraction force to the sleeve. Preferably, the bar is rigidly connected to the insert. Alternatively, the bar has a distal end with a cross section larger than that of the through hole, at least in a particular direction. Therefore, the distal end of the bar does not fit through the through hole. When the bar is pulled or otherwise actuated in a direction away from the brake assembly, the force exerted on the bar is transferred to the insert, either instantaneously (when the bar is rigidly fixed to the insert) or when then an enlarged distal end section contacts the periphery of the though hole on a distal side of the insert.

In another development, the bar is a threaded bar and the bar actuator is preferably a cooperating nut arranged at a proximal end of the threaded bar that protrudes through the through hole. In this particular development, the force is exerted by rotating the nut around the bar so as to move the threaded bar in a direction away from the brake assembly.

In another development, the device further includes a cup having a peripheral wall that defines an inner volume for housing the insert and a distal section of the bar. In this particular development, the bar actuator, in particular the nut, is arranged at a proximal end of the cup, and a distal end of the cup is arranged and configured to contact a section of the brake assembly that is proximate the adjuster unit such that when the adjuster is being extracted, the position of the bar actuator is fixed with respect to the brake assembly. This facilitates the exertion of the extraction force to the bar, in particular the threaded bar. The cup, which is in contact with the brake assembly, also exerts a force in the opposite direction to the extraction force, which further facilitates the extraction of the adjuster unit. Preferably, in a development, an outer peripheral wall of the cup comprises a grip element for holding the cup.

In yet another development of the device of the first aspect of the invention, the distal section of the insert is a distal tapered section. This facilitates the insertion of the insert between the peripheral wall of the sleeve and the proximal end of the shaft. Preferably, in another development, a distal section of the insert includes a thread arranged and configured to cooperate with the inner sealing lip. More preferably, a thread of the threaded bar has a threading direction that is different to a thread direction of the threaded distal section of the insert.

The device of the first aspect of the disclosure, in particular developments including a threaded bar and a threaded insert may be additionally used for inserting an adjuster unit into the brake assembly. Preferably, the actuator (e.g. a threaded bar) is driven in the opposite direction as for extracting the adjuster unit to insert the adjuster unit in the brake assembly and to exert an insertion force. Once inserted, the device can be turned so that the threaded insert decouples from the inner sealing lip of the sleeve.

According to a second aspect of the present disclosure, a method for extracting an adjuster unit of a brake assembly is provided, the adjuster unit including a shaft having a proximal end, a gear, and a sleeve having a peripheral wall extending circumferentially around the proximal end of the shaft. The method includes:

providing a device in accordance with the first aspect of the present invention, partially inserting the insert between the peripheral wall of the sleeve and the proximal end of the shaft, thereby engaging the inner sealing lip of the sleeve with the groove of the engaging section of the insert and receiving the proximal end of the shaft in the inner volume of the insert; and in an inserted state of the insert, transmitting, via the actuator operatively coupled to the insert, an extraction force to the sleeve so as to move the insert away from the brake assembly.

The method of the second aspect of the invention thus shares the advantages of the device for extracting the adjuster unit.

In a particular development, the step of transmitting the extraction force includes actuating a nut arranged on a threaded bar.

These and other aspects of the invention will be apparent from and elucidated with reference to the embodiments described hereinafter.

The embodiments of the present disclosure are described in the following based on the drawings in comparison with the state of the art, which is also partly illustrated. The latter is not necessarily intended to represent the embodiments to scale. The drawing is, where useful for explanation, shown in schematized and/or slightly distorted form. With regard to additions to the teaching immediately recognizable from the drawing, reference is made to the relevant prior art. It should be kept in mind that numerous modifications and changes can be made to the form and detail of an embodiment without deviating from the general concept of the present disclosure. The features of the present disclosure disclosed in the description, in the drawing, and in the claims may be included for a further development of the invention, either individually or in any combination. In addition, all combinations of at least two of the features disclosed in the description, drawing and/or claims fall within the scope of the present disclosure.

The general concept of the present disclosure is not limited to the exact form or detail of the preferred embodiments shown and described below or to a subject matter that would be limited in comparison to the subject matter as claimed in the claims.

For specified design ranges, values within specified limits of the ranges are also disclosed as limit values and thus are arbitrarily applicable and claimable.

BRIEF DESCRIPTION OF THE DRAWINGS

In the drawings:

FIG. 3A is a perspective view of an insert for use in a device for extracting an adjuster unit in accordance with another embodiment of the present disclosure;

FIG. 3B is a front view of the insert of FIG. 3A;

FIG. 3C is a front cross-section view of the insert of FIG. 3B;

FIG. 4A is a perspective view of a cup for use in a device for extracting an adjuster unit in accordance with another embodiment of the present disclosure;

FIG. 4B is a side view of the cup;

FIG. 4C is a cross-section of the cup of FIG. 4B;

DETAILED DESCRIPTION

Figure 1A:
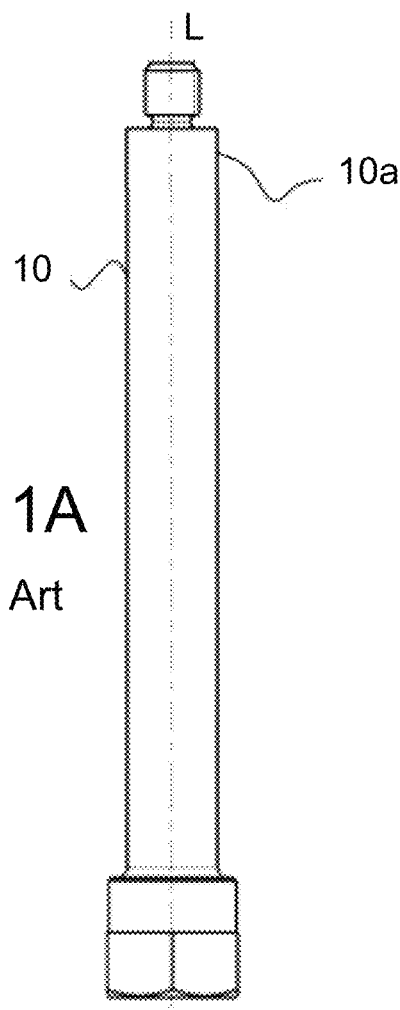
FIG. 1A is a front view of a handle used with additional tools for servicing an adjuster unit of air disc brakes.
Figure 1B:
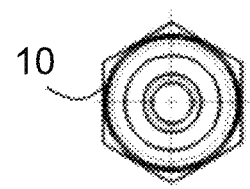
FIG. 1B is a top view of the handle.
Figure 1C:
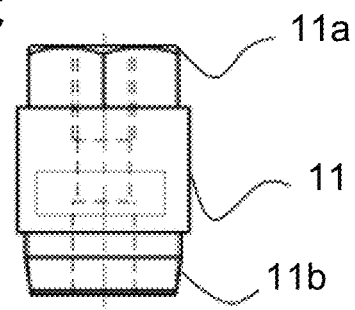
FIG. 1C is a front view of a hammer pin used with the handle.
Figure 1D:
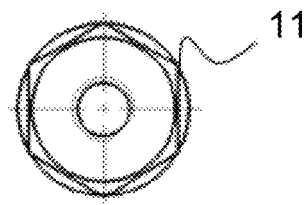
FIG. 1D is a top view of the hammer pin.
Figure 1E:
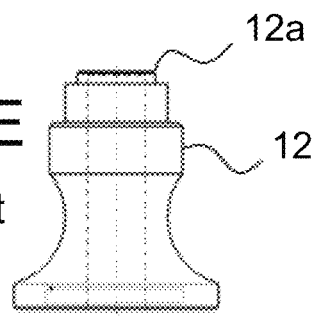
FIG. 1E is a front view of a pulling off device used with the handle.
Figure 1F:
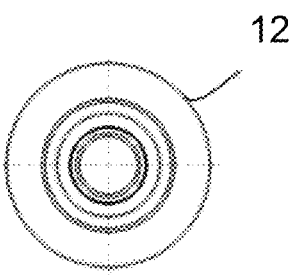
FIG. 1F is a top view of the pulling off device.

FIGS. 1A-F shows front and top views of different tools used in combination for servicing an adjuster unit 20 of air disc brakes. The tools shown in FIG. 1 exemplarily correspond to the tools provided in a service case required for servicing air disc brakes such as MAXX™ 22 brakes. The service case includes a handle 10, a hammer pin 11, and a pulling-off device 12. An adjuster unit 20 of a brake assembly 25 to be serviced or removed (see FIG. 5) includes a shaft 22, a gear 24, and a sleeve 26. When the adjuster unit 20 of a brake assembly 25 has to be removed, the handle 10 is inserted in the pulling-off device 12 such that the pulling-off device 12 loosely sits on the handle and is movable along the longitudinal direction L of the handle 10. A proximal end 11a of the hammer pin 11 is attached to a distal end 10a of the handle 10. The distal end 11b of the hammer pin 11 is screwed into the sleeve 26. Then, the pulling-off device 12 is used to beat and then pull the sleeve 26 out of the caliper of the brake assembly 25. The shaft 22 and the gear 24 can be then removed from the caliper of the brake assembly 25. For installing the adjuster unit 20 the shaft 22 is positioned in the opening of the caliper together with the gear 24, the sleeve 26 is then placed in the opening of the caliper so that a distal end of the sleeve 26 acting as a seal is arranged on the opening of the caliper. The sleeve 26 is centered on the opening of the caliper and then pressed so that the seal opening of the sleeve 26 concentrically encloses a head 22a (typically a hexagonal head) of the shaft 22. A collar section 12a of the pulling-off device 12 is then positioned and inserted in the sleeve 26 and then used to drive the sleeve 26 completely into the seat of the caliper, such that the proximal end 22a of the shaft, formed as a shaft head 22a completely protrudes from the caliper.

Figure 2C:
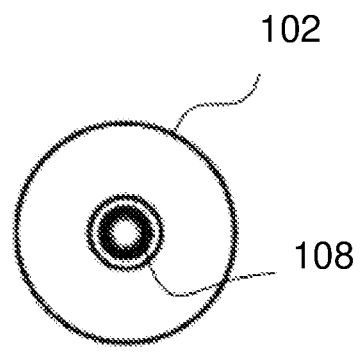
FIG. 2C is a top view of the insert and actuator.
Figure 2A:
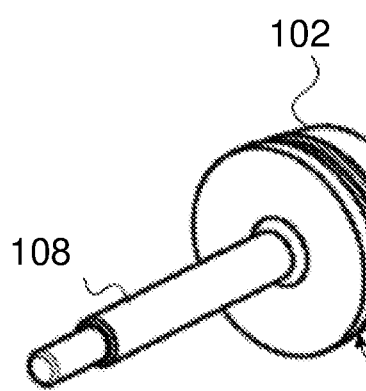
FIG. 2A is a perspective view of an insert for use in a device for extracting an adjuster unit in accordance with an embodiment of the present disclosure together with an actuator.
Figure 2B:
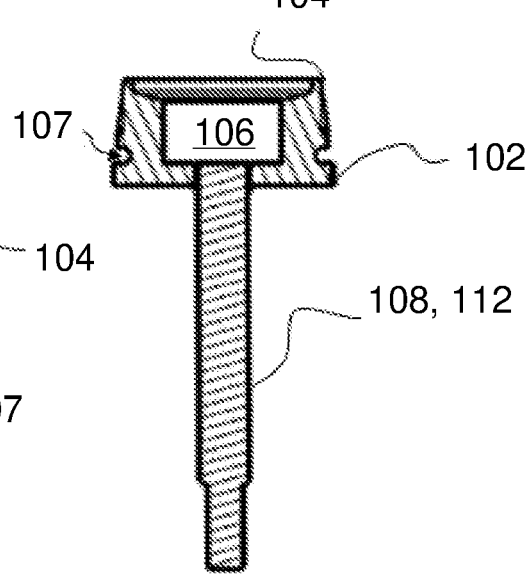
FIG. 2B is a front cross-section view of the insert and actuator.
Figure 5:
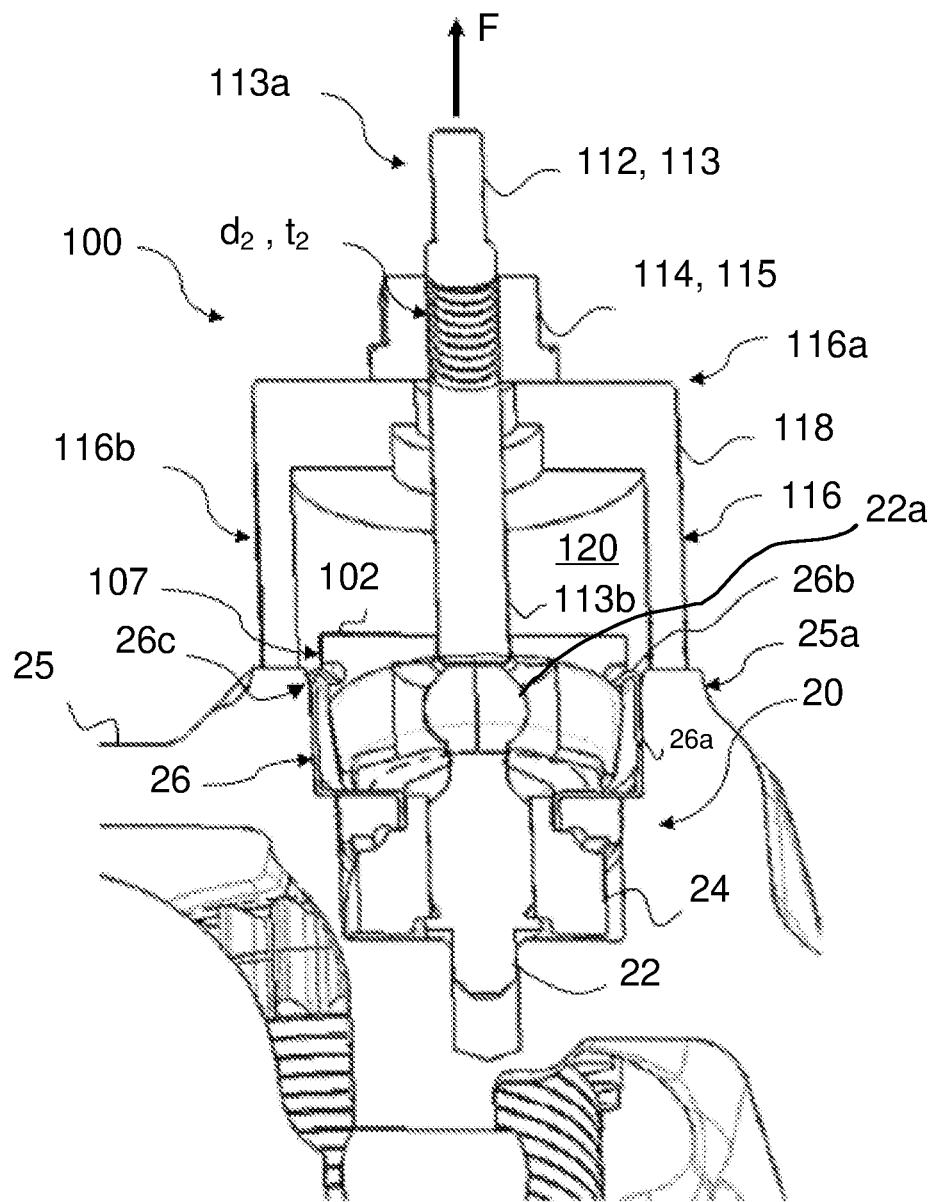
FIG. 5 is a view of an exemplary device for extracting an adjuster unit according to the present disclosure, with the insert in an inserted state.

FIGS. 2A-C show different views of an insert 102 for use in a device for extracting an adjuster unit 20 in accordance with an embodiment of the present disclosure together with an actuator 108. As explained above, the adjuster unit 20 (FIG. 5) includes a shaft 22 having a proximal end (shaft head) 22a, a gear 24, and a sleeve 26 having a peripheral wall 26a extending circumferentially around the proximal end 22a of the shaft 22 (see FIG. 5). The insert 102 is configured to be partially inserted between the peripheral wall 26a of the sleeve 26 and the proximal end 22a of the shaft 22, as shown in FIG. 5, and includes an engaging section 104 for engaging the sleeve 26 and an inner volume 106 for receiving the proximal end 22a of the shaft 22. As shown in FIG. 5, the sleeve 26 includes an inner sealing lip 26b that extends radially inwards from a proximal end 26c of the peripheral wall 26a of the sleeve 26. In FIG. 2A-C, an actuator 108 is operatively coupled to the insert 102. In this particular example, the actuator 108 is in the form of a bar and is rigidly attached to the insert. The actuator 108 is configured to, in an inserted state of the insert 102, transmit an extraction force F to the sleeve 26 so as to move the insert 102 away from the brake assembly 25 (see. FIG. 5). In another exemplary embodiment (not shown), the bar is not rigidly attached to the insert 102 but includes an abutting portion with a cross sectional area that is larger than the cross sectional area of the through hole 110 (see FIG. 3), such that the extraction force F is transmitted through the insert 102.

As it is shown in FIG. 2, the insert 102, in the engaging section 104, includes a groove 107 that is configured to engage the inner sealing lip 26b. This groove 107 further secures the insert 102 to the sleeve 26 (see FIG. 5) and facilitates the extraction of the adjuster unit 20 from the brake assembly 25.

FIGS. 3A-C shows different views of an insert 102 for use in a device 100 for extracting an adjuster unit 20 in accordance with another aspect of the present disclosure. The insert comprises a through hole 110 where an actuator (not shown in FIGS. 3A-C but similar to actuator 108) can be arranged. The engaging section 104 of the insert 102 is tapered, i.e., its cross sectional area value decreases along the longitudinal direction L away from the proximal end (shown at the top of FIGS. 3B and 3C). The following table includes exemplary values for the dimensions indicated in FIG. 3.

| Reference symbol | Value |
|---|---|
| a | 26 mm |
| b | 22 mm |
| c | 21.5 mm |
| d | 14 mm |
| e | 25 mm |
| f | 23.5 mm |
| g | 10 mm |
| h | 6 mm |
| i | 2 mm |
| j | 1.5 mm |
| k | 2.5 mm |
| α | 80° |
| β | 105° |
| γ | 8° |

With reference to the above table and FIGS. 3A-C, "a" represents the diameter of the proximal end of the insert 102, "b" represents the diameter of the insert 102 at the deepest position of the groove 107, "c" represents the diameter of an opening at the distal end of the insert 102, "d" represents the diameter of the inner volume 106, "e" represents the diameter at a distal end of the tampered section, "g" represents the distance from the groove to the distal end of the insert, "h" represents the size of the tapered section, "I" represents the width of the groove 108, "j" represents the size of an opening rim of the insert 102, "k" represents the distance from the proximal end of the insert 102 to the groove 107, "α" represents the angle of the inner side of the opening rim, "β" represents the angle of an intermediate section linking the opening rim to the inner volume and "γ" represents an angle of the distal tapered section 102a.

Additionally, the insert 102 of FIG. 3A-C includes a thread 103 (FIG. 3B) in the tapered section 104. In this particular example, the thread is an external M 25 thread with a pitch of 1.5 mm, labelled as t in FIG. 3B and with a thread direction represented by reference sign d1. The thread 103 is arranged and configured to cooperate with the inner sealing lip 26b.

FIGS. 4A-C show different views of a cup 116 for use in a device 100 for extracting an adjuster unit 20 in accordance with another aspect of the present disclosure. The cup 116 has a peripheral wall 118 that defines an inner volume 120 for housing the insert 102 and a distal section 113b of an actuator 112. As it is shown in FIG. 5, in the device 100, a bar actuator 114 is arranged at a proximal end 116a of the cup 116, and a distal end 116b of the cup 116 is arranged and configured to contact a section 25a of the brake assembly 25 that is proximate the adjuster unit 20 such that when the adjuster 20 is being extracted, the position of the actuator 112 is fixed with respect to the brake assembly 25. In FIG. 4A-C, the peripheral wall 118 of the cup 116 comprises a grip element 122 for holding the cup 116.

FIG. 5 shows a view of an exemplary device 100 for extracting an adjuster unit 20 according to the present disclosure, with the insert 102 in an inserted state. The device 100 includes the insert 102, and the actuator 112 in the form of a bar, in particular a threaded bar 113 with a thread t2 that has a direction d2, which is preferably opposite to direction d1 of the threaded tapered end section 103 of the insert 102 (see FIG. 3B). The threaded bar 113 is operatively coupled to a bar actuator 114, in particular a cooperating nut 115. The device 100 also includes cup 116.

In the inserted state shown in FIG. 5, the insert 102, in particular, the engaging section 104 of the insert 102 engages the sleeve 26, and an inner volume 106 of the insert 102 receives the proximal end 22a of the shaft 22, i.e., the shaft head. Further, the groove 107 of the insert engages the sealing lip 26b that extends radially inwards from a proximal end 26c of the peripheral wall 26a of the sleeve 26, with the sealing lip 26b extending into the groove 107.

The threaded bar 113 is operatively coupled to the insert 102 and configured to transmit the extraction force F through the insert 102 to the sleeve 26, so as to move the insert 102 away from the brake assembly 25. This is performed via operation of the nut 115 by rotating the nut 115 such that the threaded bar 113 moves away from the brake assembly 25. Because the threaded bar 113 is operatively coupled to the insert 102, the insert 102 also moves away from the brake assembly 25. Because the sleeve 26, in particular, the sealing lip 26b of the sleeve 26, is coupled to the groove 107 of the insert 102, the adjuster unit 20, or at least the sleeve 26 of the adjuster unit 20, can be removed.

Figure 6:
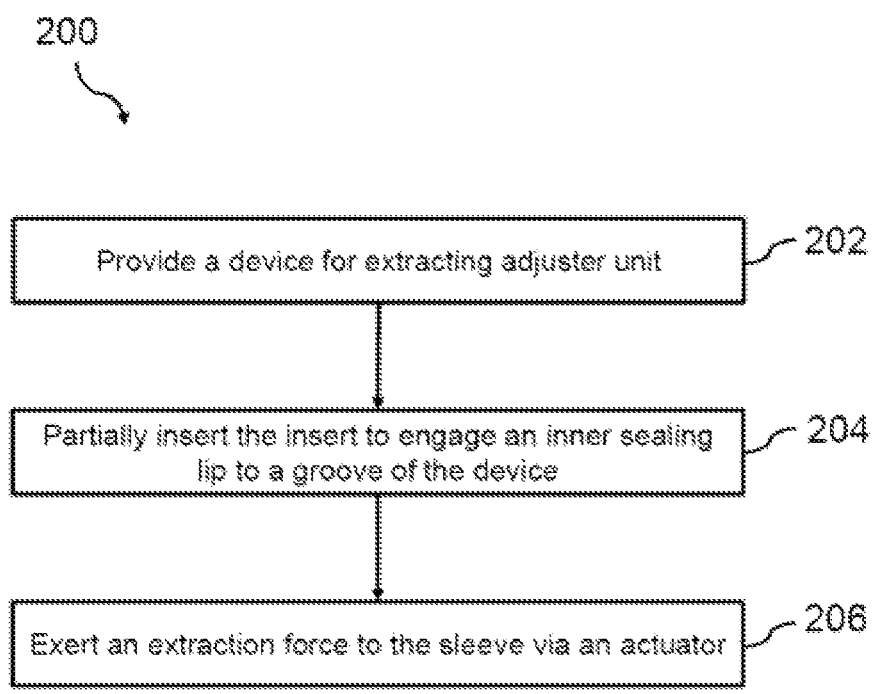
FIG. 6 is a flow diagram of an exemplary method for extracting an adjuster unit of a brake assembly.

FIG. 6 shows a flow diagram of an exemplary method 200 for extracting an adjuster unit 20 of a brake assembly 25, where the adjuster unit 20 comprises a shaft 22 having a proximal end 22a, a gear 24, and a sleeve 26 having a peripheral wall 26a extending circumferentially around the proximal end 22a of the shaft 22. The method 200 includes, in a step 202, providing a device 100 for extracting an adjuster unit 20, as described above. The method 200 also includes, in a step 204, partially inserting the insert 102 between the peripheral wall 26a of the sleeve 26 and the proximal end 22a of the shaft 22, thereby engaging the inner sealing lip 26b of the sleeve 26 with the groove 107 of the engaging section 104 of the insert 102 and receiving the proximal end 22a of the shaft 22 in the inner volume 106 of the insert 102. Further, the method includes, in a step 206, and while the insert 102 is in an inserted state, transmitting, via the actuator 108 operatively coupled to the insert 102, an extraction force F to the sleeve 26 so as to move the insert 102 away from the brake assembly 25.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

LIST OF REFERENCE NUMBERS (PART OF THE DESCRIPTION)

10 Handle
10a Distal end of handle
11 Hammer pin
11a Proximal end of hammer pin
11b Distal end of hammer pin
12 Pulling-off device
12a Collar section of pulling-off device
20 Adjuster unit
22 Shaft
22a Proximal end of shaft; shaft head
24 Gear
25 Brake assembly
25a Contact section
26 Sleeve
26a Peripheral wall of sleeve
26b Inner sealing lip
26c Proximal end of sleeve
100 Device for extracting an adjuster unit 20
102 Insert
102a Distal tapered section of insert
103 Thread of insert
104 Engaging section
106 Inner volume
107 Groove
108 Actuator
110 Through hole
112 Bar
113 Threaded bar
113a Proximal end of threaded bar
113b Distal section of threaded bar
114 Bar actuator
115 Cooperating nut
116 Cup
116a Proximal end of cup
118 Peripheral wall of cup
120 Inner volume of cup
122 Grip element
200 Method
202 Method step
204 Method step
206 Method step
d1 Thread direction
d2 Thread direction
t1 External thread of insert
t2 Thread of threaded bar
F Extraction force
L Longitudinal direction
a-k Dimensions of insert
α,β,γ Angles of insert

What is claimed is:

1. A method (200) for extracting an adjuster unit (20) of a brake assembly (25), the adjuster unit (20) comprising a shaft (22) having a proximal end (22a), a gear (24), and a sleeve (26) having a peripheral wall (26a) extending circumferentially around the proximal end (22a) of the shaft (22), the method (200) comprising the steps of:
   providing (202) a device (100) having an insert (102) and an actuator (108) operatively coupled thereto, wherein the insert (102) includes a groove (107) in an engaging section (104) of the insert and an inner volume (106),
   partially inserting (204) the insert (102) into an inserted state between the peripheral wall (26a) of the sleeve (26) and the proximal end (22a) of the shaft (22), thereby engaging an inner sealing lip (26b) of the sleeve (26) within the groove (107) of the insert (102) and receiving the proximal end (22a) of the shaft (22) in the inner volume (106) of the insert (102); and
   in the inserted state of the insert (102), transmitting (206), via the actuator (108) operatively coupled to the insert (102), an extraction force (F) to the sleeve (26), and, moving the insert (102) and at least the sleeve (26) of the adjuster unit (20) away from the brake assembly (25);
   wherein the actuator (108) comprises a threaded bar (113) and the step of transmitting (206) the extraction force (F) comprises actuating (206a) a nut (115) arranged on the threaded bar (113).

2. The method of claim 1, wherein rotation of the threaded bar (113) relative to the nut (115) moves the insert (102) axially away from the brake assembly, thereby moving the sleeve (26) engaged with the insert (102).

3. The method of claim 1, further comprising positioning a cup (116) against the brake assembly (25) and receiving at least a portion of the insert (102) within an inner volume (120) of the cup (116), and positioning the nut (115) against an outer surface of the cup (116) prior to actuating the nut (115).

4. The method of claim 3, wherein the nut (115) is held in place axially against the cup (116) during actuation, thereby causing axial movement of the threaded bar (113).

5. The method of claim 1, wherein the insert (102) comprises a through hole (110) in a longitudinal direction (L) and wherein the actuator (108) comprises a bar (112) arranged through the through hole (110) and a bar actuator (114) operatively coupled to the bar (112), wherein the bar actuator (114) moves the bar (112) away from the brake assembly (25) in the longitudinal direction (L), thereby transmitting the extraction force (F) to the sleeve (26).

6. The method of claim 5, wherein the bar actuator (114) moves the bar (112) and the insert (102) together, wherein movement of the insert (102) transmits the extraction force (F) to the sleeve (26).

7. The method of claim 1, wherein a distal section (102a) of the insert (102) is a distal tapered section (102a) that facilitates insertion of the insert (102) between the sleeve (26) and the proximal end (22a) of the shaft (22).

8. The method of claim 1, wherein a distal section (102a) of the insert (102) comprises a thread (t1, 103) arranged and configured to cooperate with the inner sealing lip (26b).

9. A method (200) for extracting an adjuster unit (20) of a brake assembly (25), the adjuster unit (20) comprising a shaft (22) having a proximal end (22a), a gear (24), and a sleeve (26) having a peripheral wall (26a) extending circumferentially around the proximal end (22a) of the shaft (22), the method (200) comprising the steps of:

providing (202) a device (100) having an insert (102) and an actuator (108) operatively coupled thereto, wherein the insert (102) includes a groove (107) in an engaging section (104) of the insert and an inner volume (106), partially inserting (204) the insert (102) into an inserted state between the peripheral wall (26*a*) of the sleeve (26) and the proximal end (22*a*) of the shaft (22), thereby engaging an inner sealing lip (26*b*) of the sleeve (26) within the groove (107) of the insert (102) and receiving the proximal end (22*a*) of the shaft (22) in the inner volume (106) of the insert (102);

in the inserted state of the insert (102), transmitting (206), via the actuator (108) operatively coupled to the insert (102), an extraction force (F) to the sleeve (26), and, moving the insert (102) and at least the sleeve (26) of the adjuster unit (20) away from the brake assembly (25); and wherein the insert (102) comprises a through hole (110) in a longitudinal direction (L) and wherein the actuator (108) comprises a bar (112) arranged through the through hole (110) and a bar actuator (114) operatively coupled to the bar (112), wherein the bar actuator (114) moves the bar (112) away from the brake assembly (25) in the longitudinal direction (L), thereby transmitting the extraction force (F) to the sleeve (26);

wherein the bar (112) is a threaded bar (113) and the bar actuator (114) is a cooperating nut (115) arranged at a proximal end (113*a*) of the threaded bar (113), wherein the threaded bar (113) protrudes from the through hole (110).

10. The method of claim 9, wherein a distal section (102*a*) of the insert (102) is a distal tapered section (102*a*) that facilitates insertion of the insert (102) between the sleeve (26) and the proximal end (22*a*) of the shaft (22).

11. The method of claim 10, wherein a distal section (102*a*) of the insert (102) comprises a thread (t1, 103) arranged and configured to cooperate with the inner sealing lip (26*b*).

12. The method of claim 11, wherein a thread (t2) of the threaded bar (115) has a threading direction (d2) that is different to a threading direction (d1) of the thread (103) of the distal section (102*a*) of the insert (102).

13. The method of claim 9, wherein relative rotation of the threaded bar (114) relative to the nut (115) causes axial movement of the threaded bar (114) and the insert (102) operatively coupled thereto.

14. The method of claim 13, wherein when the nut (115) is rotationally fixed and the threaded bar (114) rotates in a first direction relative to the nut (115), the insert (102) remains engaged with the sleeve (26) and extracts the sleeve (26).

15. A method (200) for extracting an adjuster unit (20) of a brake assembly (25), the adjuster unit (20) comprising a shaft (22) having a proximal end (22*a*), a gear (24), and a sleeve (26) having a peripheral wall (26*a*) extending circumferentially around the proximal end (22*a*) of the shaft (22), the method (200) comprising the steps of:

providing (202) a device (100) having an insert (102) and an actuator (108) operatively coupled thereto, wherein the insert (102) includes a groove (107) in an engaging section (104) of the insert and an inner volume (106), partially inserting (204) the insert (102) into an inserted state between the peripheral wall (26*a*) of the sleeve (26) and the proximal end (22*a*) of the shaft (22), thereby engaging an inner sealing lip (26*b*) of the sleeve (26) within the groove (107) of the insert (102) and receiving the proximal end (22*a*) of the shaft (22) in the inner volume (106) of the insert (102);

in the inserted state of the insert (102), transmitting (206), via the actuator (108) operatively coupled to the insert (102), an extraction force (F) to the sleeve (26), and, moving the insert (102) and at least the sleeve (26) of the adjuster unit (20) away from the brake assembly (25); and wherein the insert (102) comprises a through hole (110) in a longitudinal direction (L) and wherein the actuator (108) comprises a bar (112) arranged through the through hole (110) and a bar actuator (114) operatively coupled to the bar (112), wherein the bar actuator (114) moves the bar (112) away from the brake assembly (25) in the longitudinal direction (L), thereby transmitting the extraction force (F) to the sleeve (26);

wherein a cup (116) has a peripheral wall (118) that defines an inner volume (120) for receiving at least a portion of the insert (102) and a distal section (113*b*) of the actuator (108, 112), wherein the bar actuator (114) is arranged at a proximal end (116*a*) of the cup (116), and a distal end (116*b*) of the cup (116) contacts a section (25*a*) of the brake assembly (25) that is proximate the adjuster unit (20) such that when the adjuster unit (20) is being extracted, the position of the actuator (108, 112) is fixed with respect to the brake assembly (25).

16. The method of claim 15, wherein the peripheral wall (118) of the cup (116) comprises a grip element (122) for holding the cup (116).

17. The method of claim 15, wherein the bar actuator (114) is arranged outside of the inner volume (120).

* * * * *